Fig:1.

Nov. 25, 1947. J. B. BLACKBURN ET AL 2,431,364
LOAD TRANSMITTING MECHANISM FOR RAILWAY VEHICLE AXLES
Filed Sept. 30, 1944 3 Sheets-Sheet 2

INVENTORS
Joseph B. Blackburn
Charles M. Angel
By Synnestvedt Lechner
ATTORNEYS

Nov. 25, 1947. J. B. BLACKBURN ET AL 2,431,364
LOAD TRANSMITTING MECHANISM FOR RAILWAY VEHICLE AXLES
Filed Sept. 30, 1944 3 Sheets-Sheet 3
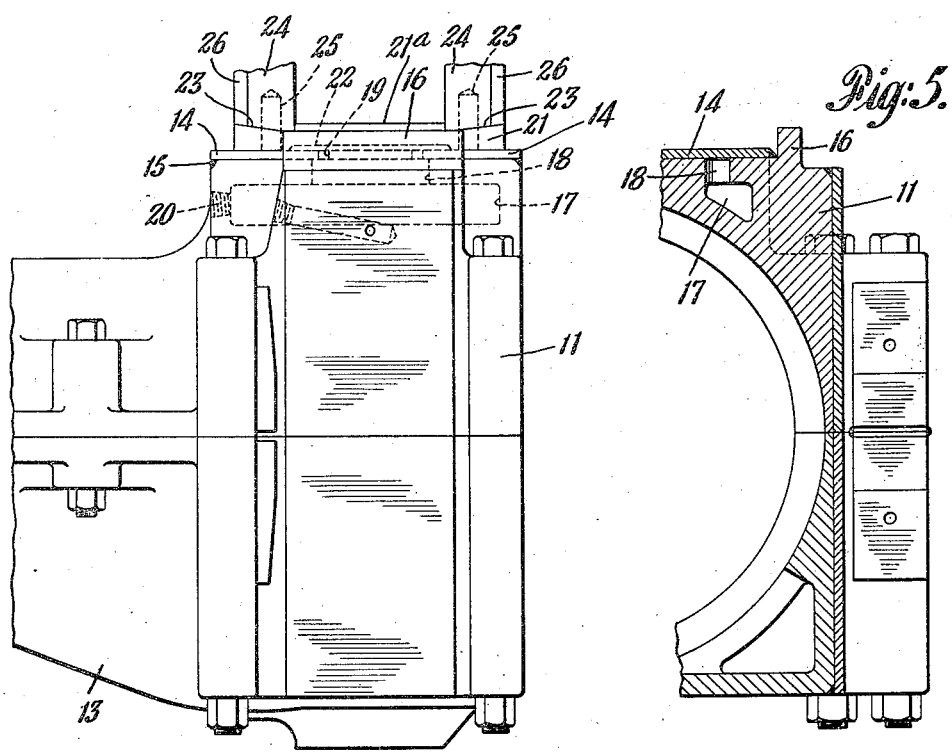
INVENTORS
Joseph B. Blackburn
Charles M. Angel
By Synnestvedt Lechner
ATTORNEYS Patented Nov. 25, 1947

2,431,364

UNITED STATES PATENT OFFICE 2,431,364

LOAD TRANSMITTING MECHANISM FOR RAILWAY VEHICLE AXLES

Joseph B. Blackburn, Richmond, Va., and Charles M. Angel, Huntington, W. Va.

Application September 30, 1944, Serial No. 556,536

6 Claims. (Cl. 105—80)

1

This invention relates to load transmitting mechanism for railway vehicle axles and is particularly concerned with the provision of a structure by means of which it is possible to eliminate all twisting and straining of the springs and spring rigging during relative lateral motion between the axle and the frame of the vehicle.

More specifically stated, it is the object of our invention to provide a construction whereby the axle with its bearings and bearing housings are free to move laterally with respect to the spring saddles so that the springs and the spring rigging are maintained in direct alignment under the guidance of the frame of the vehicle.

A further object is to reduce the stresses in wheels and axles and thereby minimize fatiguing of the metal of these parts.

The invention also includes as another object the provision of means for providing for free lateral sliding movement of the axle at relatively retarded thrust speeds whereby sharp impacts are avoided.

Another object of the invention is to provide a structure of the character indicated which can be readily applied to existing equipment without the necessity of making extensive or expensive alterations.

Still other objects of the invention involve the provision of means whereby machining is reduced to a minimum and whereby repairs or renewals can be expeditiously and inexpensively made.

A further object is the provision of simple means for effectively lubricating the wearing surface at the top of the bearing housing which receives the load of the vehicle.

Although not necessarily limited thereto, the invention is particularly applicable to the driving axles of locomotives wherein the housings for the axle bearings are constrained to move in unison. Furthermore, the invention is applicable (1) to roller bearing installations with free lateral motion, (2) to roller bearing installations with controlled lateral motion or (3) to friction bearing installations wherein the bearing housings or boxes are constrained to move together and with either free or controlled lateral motion.

The accompanying drawings illustrate a preferred embodiment of the invention as applied to a locomotive driving axle equipped with roller bearings and having what is known as free or uncontrolled lateral motion. In the drawings, Figure 1 is a vertical section of our improved equipment taken longitudinally of a driving axle;

Figure 2 is a section on an enlarged scale taken as indicated by the line 2—2 on Figure 1;

2

Figure 3 is a section on the line 3—3 of Figure 2 but with the spring saddle omitted;

Figure 4 is an elevation of the side of one end of the bearing housing arrangements showing our improvements applied thereto, the view being taken from the same direction as that shown in Figure 1; and Figure 5 is a section taken as indicated by the line 5—5 on Figure 3.

Figure 1:
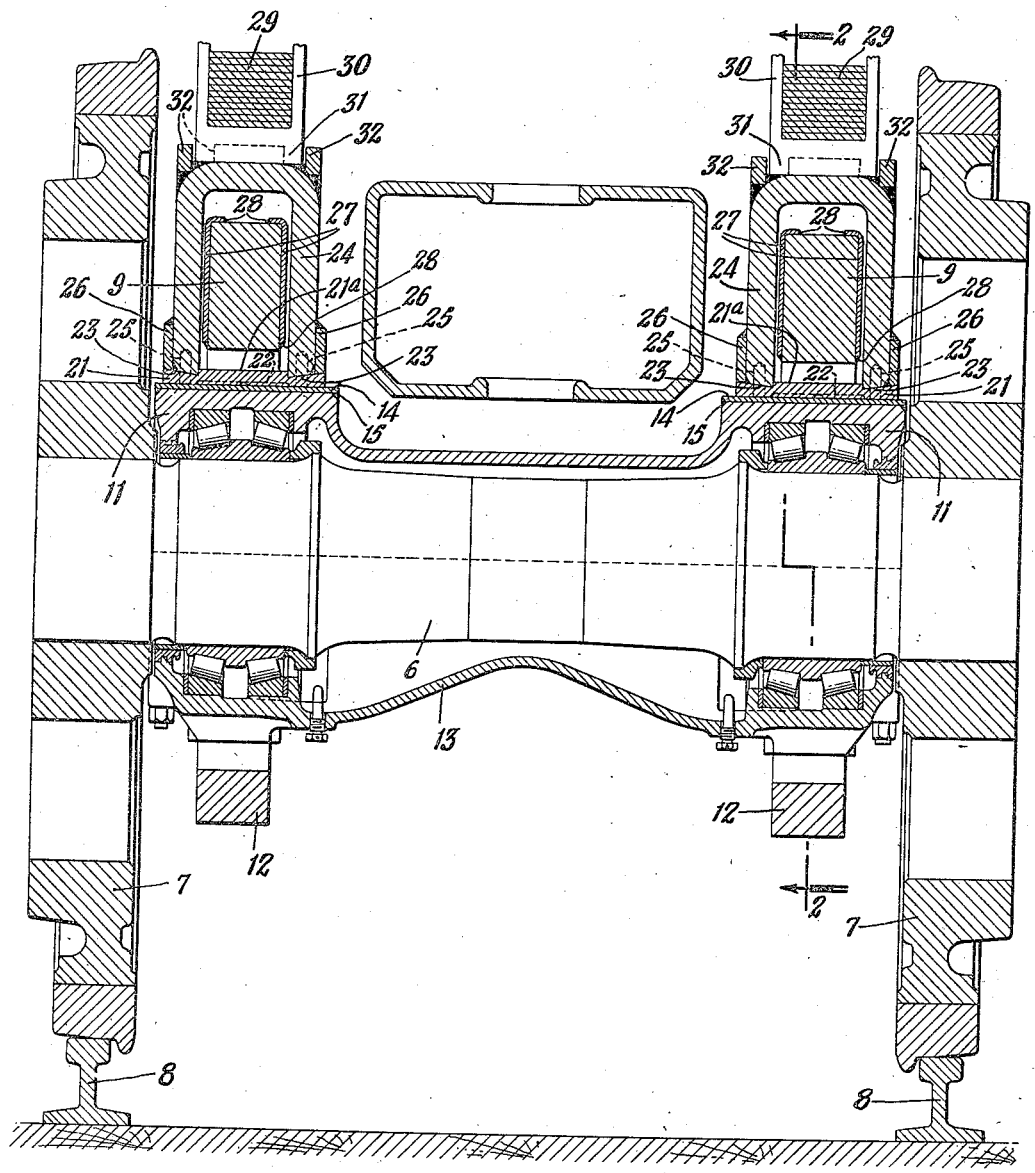

In the drawings the axle 6 is a driving axle of a locomotive, on each end of which is mounted a driving wheel 7, the wheels being shown as resting upon the rails 8.

The frame members 9 of the locomotive are provided with the usual pedestal jaws 10 adapted to embrace the bearing housings or driving boxes 11. The usual pedestal binder 12 closes the opening between the lower ends of the jaws 10.

The bearing housings or boxes 11 are rigidly interconnected by the structural framework 13 which surrounds the axle 6 and constrains the two boxes to move in unison upon relative lateral motion between the axle and the frame of the locomotive. The details of the bearing structure within the housings 11 form no part of the present invention but it is noted that the structure is so related to the axle and the wheels as to cause all of these parts to move as a unit relative to the frame and the spring saddles, which latter are described below.

Figure 2:
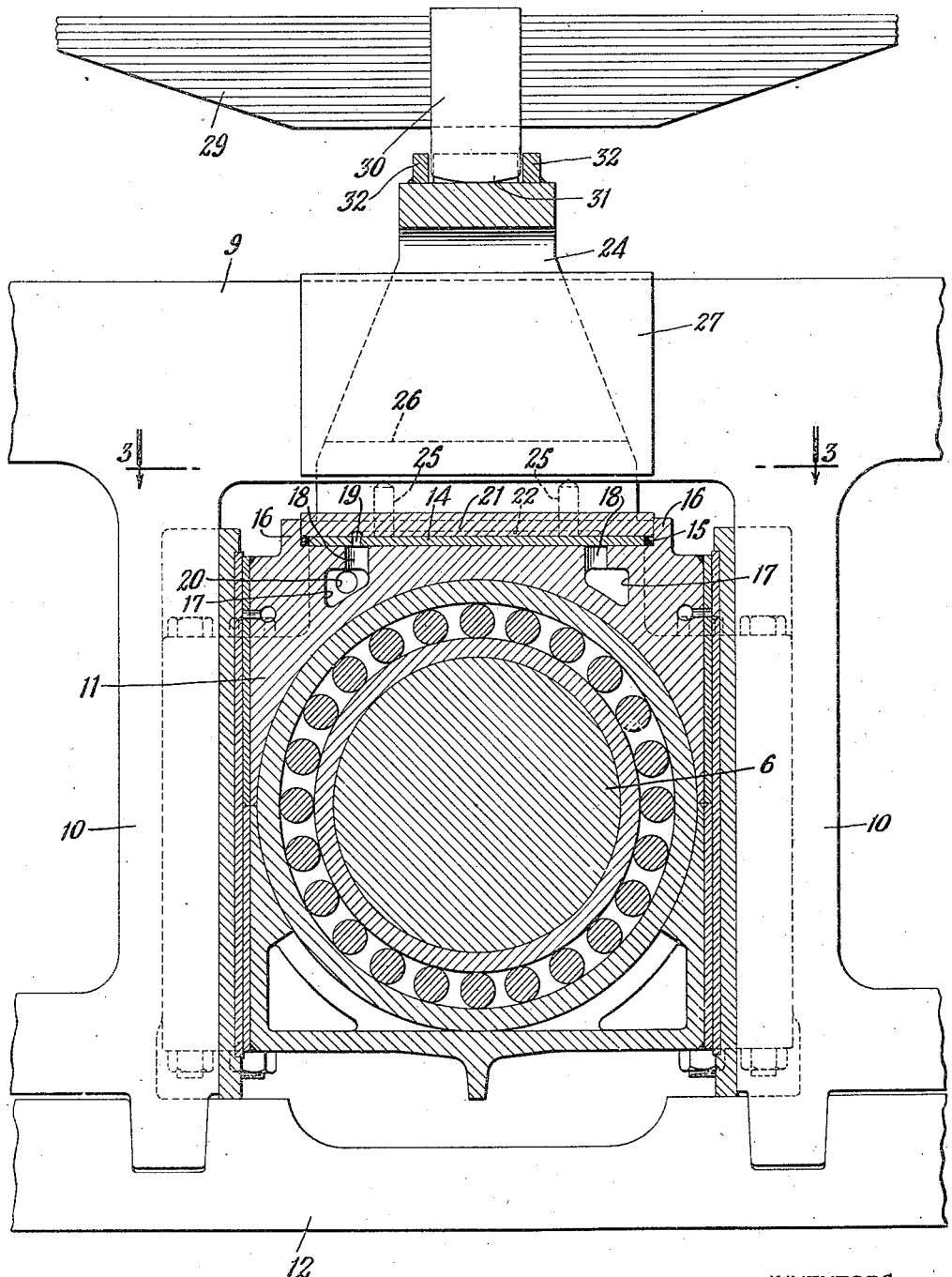

On the upper surface of each of the bearing housings 11, we provide a wear plate 14 which is secured to the housing in any desired manner, preferably by welds 15. These plates fit between upwardly projecting lugs 16 on the sides of the bearing housing, as seen to best advantage in Figure 2.

Immediately below the wear plates, the housings 11 are provided with oil cavities 17, one at each side, which cavities extend longitudinally of the axle. The cavities 17 include upwardly extended oil pockets 18 which open through the top of the housing immediately below the under-faces of the wear plates 14. Lubricating apertures 19 extend through the wear plate at a point in alignment with one of the pockets 18 as shown to best advantage in Figures 2 and 3. The lubricant is introduced through the connection 20 which delivers to the cavity 17 at the left-hand side of the device as viewed in Figures 2 and 3. The lubricant passages just described bring the lubricant to the upper or wearing face of the wear plate 14. In order to aid the distribution of the lubricant over the upper face of the wear plate, the under-face of the superimposed seat member 21 for the saddle is provided with X-shaped lubricating grooves 22.

The seat member 21 for the saddle rests directly upon the upper face of the wear plate 14 and is also adapted to fit between the side lugs 16 on the bearing housing. The upper surface of this seat member has a central raised portion 21a and an inclined shoulder portion 23 at each side, upon which latter the legs of the saddle 24 are adapted to rest as shown to best advantage in Figures 1 and 4. Extending between the bottom of the legs of the saddle 24 and the shoulder portions 23 are dowel pins 25 which serve as an aid in holding the saddle and the seat member in their proper relative positions. There are four of these dowels, two for each leg of the saddle. At the outside of each leg of the saddle near the bottom, there is provided a plate 26 which is firmly welded thereto, said plate serving to reinforce the bottom of the legs of the saddle as well as to provide a somewhat extended bearing upon the sloping shoulders 23 of the seat member 21.

A wear plate 27 is secured to each side of the frame members 9 of the locomotive in order to receive the thrust of the inside of the spring saddle. These plates are shouldered at the top and are held in place in any desired manner as by the welding 28.

The load of the vehicle is delivered through the springs 29, the shackles 30 of which have a downwardly projecting portion 31 which fits between the upstanding lugs 32 welded to the top of the saddle, so as to form a pocket suitable for the purpose. The lugs 32 are formed as pairs of opposed plates suitably welded to the upper surface of the spring saddle.

In conclusion, we wish to point out that by means of our invention it is an extremely simple and relatively inexpensive matter to convert a standard saddle and bearing housing arrangement where the saddle is fixed with respect to the housing into the arrangement of the present invention where the bearing housing is free to move laterally with respect to the saddle under relative motion between the axle and the frame of the vehicle. In this way, we completely eliminate all twisting action on the spring and the spring rigging so that the latter are held or maintained at all times in the direct line of the thrust of the load. The load is distributed uniformly over the bearing housing which avoids excessive strains on any one part. Furthermore, the arrangement reduces the stresses in the wheels and axles and thereby minimizes fatiguing of the metal of these parts as well as of all of the parts which, heretofore, have been put under excessive strains by the restricted or restrained type of lateral motion employed in prior devices.

The wheels, the axle, the bearing housings 11, the connecting structure 13 and the wear plates 14 all move as a unit during relative lateral sliding motion between the axle and the frame 9 and all wear is concentrated on the upper surfaces of the wear plates and the bottom surfaces of the seat members 21, both of which members can be readily and inexpensively renewed.

In addition, the sliding of the two plates 14 and 21 relative to each other produces something in the nature of a snubbing action which tends to retard the speed and thrust of the lateral motion thereby eliminating the sharp impacts which have been characteristic of previous devices where the lateral motion takes place relatively quickly and suddenly.

Furthermore, our improved structure greatly simplifies the matter of machining the rubbing surfaces as well as the matter of providing a suitably polished and/or hardened surface for receiving the wear. The wear plates 14 and the seating members 21 can be separately made from any suitable material and accurately machined before assembly.

What we claim is:

1. In load transmitting mechanism for the axle of a railway vehicle which has a longitudinally extending side frame member at each end of the axle; the combination with said side frame members of a bearing housing at each end of the axle, means constraining said housings to move in unison, a load receiving wear plate secured to the upper face of each bearing housing, and a spring saddle mounted to slide on each of said wear plates upon relative movement of the bearing housings with respect to the saddles, said saddles having legs which straddle said frame members whereby the saddles are held in substantially fixed load receiving alignment.

2. The structure of claim 1 wherein the sides of the frame members against which the saddle legs abut are provided with wear plates.

3. In load transmitting mechanism for a railway vehicle axle, the combination of an axle bearing housing, a load receiving wear plate secured to the upper face of said housing, a spring saddle above said wear plate, a saddle seat member resting on said wear plate, said seat member having a fixed relation to the saddle, an oil cavity in the housing having an opening which delivers upwardly toward the under side of the wear plate, and a passage in the wear plate for delivering oil received from said cavity to the under side of said seat member.

4. In load transmitting mechanism for a railway vehicle axle, the combination, with the longitudinal side frame members of the vehicle, of a bearing housing at each end of the axle, means constraining said housings to move in unison, a load receiving wear plate secured to the upper face of each bearing housing, a spring saddle at each end of the axle having legs straddling the adjacent frame member, and a seat member upon which each saddle rests, each seat member having a fixed relation to its saddle but adapted to slide on its wear plate in a direction longitudinally of the axle, and each saddle being held in substantially fixed load receiving alignment by the frame member which it straddles.

5. The structure of claim 4 wherein the sides of the frame member against which the saddle legs abut are provided with wear plates.

6. In mechanism for transmitting load of a railway vehicle to a bearing housing at an end of an axle of said vehicle, where the vehicle has a longitudinally extending frame member in relation to which said housing has motion laterally of the vehicle as well as vertically, and further where said housing is adapted to be moved by means which transmit motion thereto from a corresponding bearing housing at the opposite end of the axle; a spring saddle having legs which are adapted to straddle the frame member and to extend downwardly toward the bearing housing, the saddle being adapted to be held in substantially fixed load receiving alignment by the frame member, and a saddle seat member having a normally fixed relation to the saddle legs and adapted to rest upon the bearing housing so as to transmit load thereto and to move vertically therewith but slidable thereon to provide for lateral motion of said housing relative to said seat without disturbing the alignment of the spring saddle with said frame member.

JOSEPH B. BLACKBURN.
CHARLES M. ANGEL.

REFERENCES CITED

The following references are of record in the file of this patent:

UNITED STATES PATENTS

| Number | Name | Date |
| --- | --- | --- |
| 265,724 | Webb | Oct. 10, 1882 |
| 1,431,720 | Bunker | Oct. 10, 1922 |
| 644,071 | Gummi | Feb. 27, 1900 |

FOREIGN PATENTS

| Number | Country | Date |
| --- | --- | --- |
| 2,285 | Great Britain | 1864 |